(12) United States Patent
Anderson et al.

(10) Patent No.: US 6,379,813 B1
(45) Date of Patent: Apr. 30, 2002

(54) PIGMENTED COMPOSITIONS AND ARTICLES OF MANUFACTURE CONTAINING SAME

(75) Inventors: Jeffery L. Anderson, Racine; Stephen A. Fischer, Franklin; Harry T. Mills, Jr., Racine; Thomas M. Sisson, Racine; Daniel A. Teska, Racine, all of WI (US)

(73) Assignee: S. C. Johnson Commercial Markets, Inc., Sturtevant, WI (US)

( * ) Notice: Subject to any disclaimer, the term of this patent is extended or adjusted under 35 U.S.C. 154(b) by 0 days.

(21) Appl. No.: 09/398,244

(22) Filed: Sep. 17, 1999

(51) Int. Cl.[7] ............................................. B32B 27/06
(52) U.S. Cl. .................... 428/483; 427/393.5; 428/517; 428/520; 428/522; 428/523; 524/502; 524/507; 524/513; 524/514
(58) Field of Search .................. 427/393.5; 428/323, 428/324, 325, 328, 329, 330, 331, 483, 517, 520, 523, 522; 524/507, 502, 513, 514

(56) References Cited

U.S. PATENT DOCUMENTS

| | | | |
|---|---|---|---|
| 4,444,923 A | 4/1984 | McCarty | 523/406 |
| 4,839,413 A | 6/1989 | Kiehlbauch et al. | 524/460 |
| 5,026,755 A | 6/1991 | Kveglis et al. | 524/389 |
| 5,075,364 A | 12/1991 | Phan et al. | 524/190 |
| 5,141,556 A | 8/1992 | Matrick | 106/20 |
| 5,147,706 A | 9/1992 | Kingman | 428/192 |
| 5,338,785 A | 8/1994 | Catena et al. | 524/39 |
| 5,693,702 A | 12/1997 | Hutter | 524/457 |
| 5,897,694 A | 4/1999 | Woolf | 106/31.27 |
| 5,912,280 A | 6/1999 | Anton et al. | 523/161 |

FOREIGN PATENT DOCUMENTS

| | | |
|---|---|---|
| WO | WO 9745495 | 12/1997 |
| WO | WO9924510 | 5/1999 |
| WO | WO0040630 | 7/2000 |

*Primary Examiner*—D. S. Nakarani
(74) *Attorney, Agent, or Firm*—Renee J. Rymarz; Neil E. Hamilton; Warren R. Bovee

(57) ABSTRACT

Novel polymeric compounds are disclosed which may be utilized alone, or after being further polymerized into an emulsion polymer, to form pigmented compositions that are useful in a variety of pigmented compositions, including inks. The inks produced have high bond strength, and are suitable for use in a large number of printing processes, most notably processes involving printing onto flexible substrates.

68 Claims, No Drawings

PIGMENTED COMPOSITIONS AND ARTICLES OF MANUFACTURE CONTAINING SAME

FIELD OF THE INVENTION

This invention relates to polymeric compositions, emulsion polymers containing such polymeric compositions, pigmented compositions containing such emulsion polymers, articles of manufacture containing such pigmented compositions, and methods of producing the same.

BACKGROUND OF THE INVENTION

Pigmented compositions such as inks are useful in a wide variety of applications on various types of substrates. Inks may be used to print letters or designs, or to impart color on substrates. These substrates may include such materials as films or other flexible packaging materials. An important printing process for printing on flexible substrates is lamination printing.

Lamination printing usually entails applying ink to the reverse side of the flexible substrate. The inked substrate is then laminated onto a second substrate. This lamination may be performed using either a molten film such as polyethylene, known as extrusion lamination, or using a combination of a water-based, solvent-based or solventless adhesive followed by a second flexible substrate, a process known as adhesive lamination.

Inks suitable for printing on flexible substrates in lamination printing must have certain physical requirements. However, these requirements differ depending on whether the ink is to be used in adhesive lamination printing processes or in extrusion lamination printing processes. Adhesive lamination processes are conducted at lower temperatures and generally require the ink to have compatibility with adhesives; high bond strength; resolubility characteristics; the ability to adhere to multiple substrates; second heat stability so that adhesion and bond strengths will continue after heat-sealing; flexibility; and good print quality. On the other hand, inks used in high temperature extrusion lamination processes are required to have good adhesion; high bond strengths; solvent-tolerance; and some flexibility.

In order to improve inks for use in lamination processes, various polymers have been added to inks. These polymers may be incorporated into an emulsion polymer. The emulsion polymer in turn is utilized to formulate printing inks. However, such polymers, and emulsion polymers formed from such polymers, generally are suited for use in either adhesive lamination processes or extrusion lamination process, but not both, given the different temperatures the inks are exposed to in each type of process. There remains a need for polymers, and emulsion polymers that incorporate these polymers, that can be used to formulate pigmented compositions, such as inks, that exhibit superior bond strength, superior adhesion, flexibility, good print quality, and solvent tolerance when used in extrusion and adhesive lamination printing.

SUMMARY OF THE INVENTION

The present invention is directed to a polymeric composition that can be utilized in pigmented compositions. The polymeric composition generally comprises a reaction product of an A polymer and a B polymer. The A polymer is an addition polymer having 3.5 or more reactive functional groups per polymer chain, and the B polymer has about 2 to about 3 functional groups per polymer chain that are co-reactive with the reactive functional groups of the A polymer. The polymeric composition further has a Tg from about 20° C. to about 70° C. Preferably, the polymeric composition is formed by reacting (a) an A polymer consisting of polymerized monomers of styrene, α-methylstyrene, 2-ethylhexyl acrylate, and acrylic acid, the A polymer having a weight average molecular weight of about 1000 to about 3000 and (b) a B condensation polymer consisting of polymerized monomers of 2-methyl-1,3-propanediol, isophthalic acid, and 1,4-cyclohexane dicarboxylic acid, the B condensation polymer having a number average molecular weight of about 1000 to about 3000.

The invention also relates to acrylic-condensation hybrid emulsion polymers that can be utilized in pigmented compositions. These emulsion polymers comprise polymerized unsaturated monomers and a polymeric composition that is the reaction product of an A polymer and a B polymer. The A polymer is an addition polymer having 3.5 or more reactive functional groups per polymer chain, and the B polymer has about 2 to about 3 functional groups per polymer chain that are co-reactive with the reactive functional groups of the A polymer. The polymeric composition will preferably have a Tg within a specified range, to facilitate the use of the emulsion polymer in pigmented compositions suitable for use in both extrusion and lamination printing processes. The Tg of the polymeric composition will preferably range from about 20° C. to about 70° C., more preferably from about 40° C. to about 50° C., and will most preferably be about 45° C. Similarly, the emulsion polymer will preferably have a Tg within a specified range, to facilitate the use of the emulsion polymer in pigmented compositions suitable for use in both extrusion and lamination printing processes. The Tg of the emulsion polymer will preferably range from about −31° C. to about 70° C., more preferably from about 30° C. to about 45° C., and will most preferably be about 39° C. In one preferred embodiment, the emulsion polymer will be made using the preferred polymeric composition and unsaturated monomers which are selected from a group including styrenic monomers, monomers having the general formula CH2=C(X)C(O)OR where X is either H or $CH_3$, and R is an alkyl group having at least one carbon, and combinations of these monomers.

In another embodiment, the invention is directed to a method of producing an acrylic-condensation hybrid emulsion polymer, comprising reacting unsaturated monomers with a polymeric composition at a sufficient temperature for a sufficient period of time to produce an acrylic-condensation hybrid emulsion polymer, wherein the polymeric composition is the reaction product of an A polymer and a B polymer, the A polymer being an addition polymer having 3.5 or more reactive functional groups per polymer chain, and the B polymer having about 2 to about 3 functional groups per polymer chain that are co-reactive with the reactive functional groups of the A polymer. A suitable initiator may be added to the reaction. The invention also includes emulsion polymers made by the processes of the present invention.

The invention also relates to aqueous pigmented compositions that comprise a pigment and an acrylic-condensation hybrid emulsion polymer as previously described. Preferably, the pigment is contained within a pigment dispersion. In a preferred embodiment, the aqueous pigmented composition comprises about 40% to about 60% by weight pigment dispersion and about 40% to about 60% by weight acrylic-condensation hybrid emulsion polymer. The aqueous pigmented composition may optionally further comprise one or more additional additives. These additives are selected from the group consisting of a solvent, a leveling agent, a rheology agent, a coalescing agent, a pigment wetting agent, a wax, a buffering agent, a dispersing agent, a surfactant, a defoaming agent, an antifoaming agent, a modifying polymer, a rewetting agent, a biocide, a resolubility agent, and combinations thereof. These aqueous pigmented compositions may be used as adhesive laminating inks and/or extrusion laminating inks. The invention also includes the methods of making such aqueous pigmented compositions and the pigmented compositions resulting from the methodology.

The present invention is further drawn to a method for improving the properties of a liquid ink entailing adding a polymeric composition of the present invention to a liquid ink formulation. The resulting liquid ink formulation has improved bond strength over a similar liquid ink formulation which is identical except for the absence of the polymeric composition.

The present invention also relates to an article of manufacture. The article of manufacture comprises an aqueous pigmented composition applied to at least a portion of a substrate. The pigmented composition may comprise a pigment or a pigment dispersion, together with the polymeric composition of the invention. The polymeric composition of the present invention may be present by itself in a liquid formulation, or may be incorporated into an emulsion polymer as previously described. The substrate may be any flexible substrate known in the art, preferably foils, synthetic organic polymers, metallized films, cellulose containing products, natural fabrics, synthetic fabrics and combinations thereof. The invention is also directed to a method of producing the article of manufacture and articles produced by the method.

Preferred articles of manufacture are laminated and comprise a primary substrate; an aqueous pigmented composition applied to at least a portion of the primary substrate; an adhesive applied over at least a portion of the aqueous pigmented composition applied to the primary substrate; and a secondary substrate adhered to the adhesive. The pigmented composition may comprise a pigment or a pigment dispersion, together with the polymeric composition of the invention. The primary and secondary substrates may be any flexible substrate known in the art, preferably foils, synthetic organic polymers, metallized films, cellulose containing products, natural fabrics, synthetic fabrics and combinations thereof. The adhesive is any material that allows the secondary substrate to be adhered to the pigmented composition. The invention is also directed to a method of producing the article of manufacture and articles produced by the method.

DETAILED DESCRIPTION OF THE INVENTION

It has been surprisingly and unexpectedly discovered that the polymeric products of the present invention, when incorporated into pigmented compositions, offer advantages when used in either extrusion lamination processes or adhesive lamination process. The pigmented compositions of the present invention give high performance in such applications due to increased bond and adhesion strength.

The polymeric compositions of the present invention are produced by a process known in the art, and described in co-pending U.S. patent application Ser. No. 08/968,321, now issued U.S. Pat. No. 6,194,510, the entire contents of which are hereby incorporated by reference. Although such polymeric compositions are generally known, it has now been discovered that such polymeric compositions can be advantageously utilized in pigmented compositions that are suitable for use with flexible substrates. Further, the general teaching of U.S. Ser. No. 08/968,321, now issued U.S. Pat. No. 6,194,510, has been expanded as the present inventors have determined specific polymeric compositions which are particularly useful when incorporated into pigmented compositions for use in printing on flexible substrates.

The polymeric compositions utilized in the present invention are preferably substantially non-gelled. The term "substantially non-gelled" is defined herein as being free of gelling or gel particles to any degree that would adversely affect the polymeric composition or any end product or further reaction in which the polymeric composition is used.

The polymeric composition of the present invention comprises the reaction product of an A polymer and a B polymer. The A polymer is an addition polymer having 3.5 or more reactive functional groups per polymer chain. Although the B polymer may be an addition or condensation polymer, it is preferably a condensation polymer. The B polymer has about 2 to about 3 functional groups per polymer chain that are co-reactive with the reactive groups on the A polymer. The reactive functional groups of the A polymer are condensation-reactive functional groups selected from the group consisting of carboxyl, hydroxyl, epoxy, isocyanato, carboxyl, anhydride, sulfo, esterified oxycarbonyl, amino and mixtures thereof. The B polymer chain is selected from the group consisting of polyamide, polyester, epoxy, polyurethane, polyorganosiloxane, and polyether. The co-reactive functional groups on the B polymer chain are selected from the group consisting of hydroxyl, carboxyl, epoxy, oxazolinyl, ester, amino, isocyanato, and mixtures thereof.

It has been surprisingly and unexpectedly discovered that when the polymeric compositions are produced having specific Tg values, these polymeric compositions are especially suited for use in pigmented compositions used in printing on flexible substrates. In the present invention, the polymeric compositions have a preferred Tg value ranging from about 20° C. to about 70° C., more preferably from about 40° C. to about 50° C., and even more preferably of about 45° C.

The ratio of A polymer to B polymer in the polymeric composition may range from about 3:1 to about 1:1. In a preferred embodiment, the polymeric composition comprises a B polymer having about 2 functional groups per B polymer chain, and the molar ratio of A polymer to B polymer is about 2:1.

It has also been found that when producing polymeric compositions for use in pigmented compositions, surprisingly good results are shown when the co-reactive functional group on the B polymer chain is hydroxyl. Specifically, polymeric compositions formed by reacting an A polymer consisting of polymerized monomers of styrene, α-methylstyrene, 2-ethylhexyl acrylate, and acrylic acid, the A polymer having a weight average molecular weight of about 1000 to about 3000, with a B condensation polymer consisting of polymerized monomers of 2-methyl-1,3-propanediol, isophthalic acid, and 1,4-cyclohexane dicarboxylic acid, the B condensation polymer having a number average molecular weight of about 1000 to about 3000, results in novel polymeric compositions that, when incorporated into pigmented compositions, exhibit high bond strength, and have good adhesion, flexibility, and solvent compatibility characteristics when used in printing process for flexible substrates.

Emulsion polymerization is a heterogeneous noncatalytic reaction. The reaction is based on the mixing of a polymerizable monomer and a surfactant in water to yield both monomer droplets and solubilized monomer in micelles.

The free radical required for initiating polymerization is generated in the aqueous phase and can enter the monomer droplet or monomer swollen micelle. The emulsion polymers are formed by the polymerization of the monomers capable of undergoing free radical emulsion polymerization. The average molecular weight of polymers prepared using emulsion polymerization is usually greater than polymers made using solution or bulk polymerization methods. Typically, emulsion polymers have an average molecular weight in the range of 200,000 to 1,000,000. Emulsion polymers are particularly useful in preparing pigmented compositions such as inks, paint coatings, etc. Procedures for producing emulsion polymers are well known to those skilled in the art, for example, as described in U.S. Pat. No. 4,839,413 which is hereby incorporated by reference.

Emulsion polymers are typically prepared using ionomer polymeric surfactants. In the present invention, the polymeric product is utilized as the ionomeric surfactant during formation of the emulsion polymer.

The polymeric compositions are added to emulsion polymerization reactions to produce emulsion polymers, which are, in turn, utilized to formulate pigmented compositions useful in printing inks.

In practicing the present invention, it is preferable to add the polymeric composition to the emulsion polymerization reaction mixture prior to initiation of the polymerization. The polymeric composition can be added as a solid, a solution, or as a slurry, although addition of the polymeric composition as a solution is preferred. The monomers employed in the emulsion polymerization reaction can be added to the reaction mixture in either a single stage addition or in a multi-stage addition.

In conducting the present emulsion polymerization reaction, known emulsion polymerization techniques may be employed. Preferably, the reaction is conducted at an elevated temperature of from about 60° C. to about 100° C. at ambient pressure and under an inert atmosphere such as nitrogen. Generally, the reaction mixture is maintained under agitation employing standard mixing techniques.

Suitable conventional monomers for use in the emulsion polymer include ethylenically unsaturated monomers that result in an emulsion polymer having a Tg from about −40° C. to about 100° C., as defined by the Gordon-Taylor-Fox relation described in Equation 1:

$$1/Tg = W(i)/Tg(i) + W(ii)/Tg(ii) \quad \text{Equation 1.}$$

wherein W(i) and W(ii) are weight fractions of monomers (i) and (ii) in the polymer;

and Tg(i) and Tg(ii) are the glass transition temperatures of homopolymers made of monomers (i) and (ii). In a preferred embodiment, the Tg of the emulsion polymer ranges from about −31° C. to about 70° C., more preferably from about 30° C. to about 45° C., and most preferably is about 39° C.

The unsaturated monomers are preferably selected from a group including styrenic monomers; monomers having the general formula $CH_2=C(X)C(O)OR$ where X is either H or $CH_3$, and R is an alkyl group having at least one carbon; and combinations of these monomers. The choice of unsaturated monomers will depend on the desired Tg of the final emulsion polymer as well as the polymeric composition used to produce the emulsion polymer. Preferred styrenic monomers include a-methylstyrene, styrene, vinyl toluene, p-methylstyrene, t-butylstyrene, o-chlorostyrene, vinyl pyridine, and mixtures of these species. In more preferred embodiments, the unsaturated monomers include 2-ethylhexyl acrylate, methyl methacrylate, butyl acrylate, methacrylic acid, styrene, α-methylstyrene and combinations of these monomers.

Any suitable weight combination of polymeric composition and unsaturated monomers may be used to produce the emulsion polymer. Preferably, the emulsion polymer will comprise from about 25% to about 50% by weight of the polymeric composition with the balance of the emulsion polymer comprising the polymerized unsaturated monomers. In a most preferred embodiment, the emulsion polymer comprises about 38% by weight of the polymeric composition, the balance comprising the polymerized unsaturated monomers. Emulsification aids including, but not limited to, ethoxylated linear alcohol, preferably about 0.75% by weight, and poly(ethylene oxide-co-propylene oxide), preferably about 2.5% by weight, or other surfactants are incorporated in a preferred embodiment. Other additives to help in the emulsion polymerization process, such as polyglycol, preferably about 0.36% by weight, are included in the preferred embodiment. Other ingredients may include, but are not limited to, additional monomers such as styrene, butyl acrylate and ethyl acrylate; ionic and nonionic surfactants; and other initiators.

The pH at which these emulsion polymers are prepared effects their stability. The suitable pH range for use in the polymerization reactions is preferably from about 7.5 to 9.5, with a more preferred range being 7.5 to 8.5.

The emulsion polymers or polymeric compositions of the present invention may be used in pigmented compositions such as inks or paints. The inks of the present invention have been shown to be very useful in printing on a variety of flexible substrates, especially substrates utilized by the packing industry such as, but not limited to, polypropylene, polyethylene, polyethylene terephthalate.

It has been advantageously found that when the emulsion polymers and/or polymeric compositions are incorporated into inks, the inks exhibit outstanding bond strength. Typical bond strengths for commercial water-based inks generally are about 150 grams/inch. Commercial water-based inks generally require a polyethyleneimine or polyurethane primer to achieve a bond strength of this value. Generally, such primers are only used in extrusion lamination and solvent-based inks. Unprimed commercial water-based inks typically have a bond strength of less than 25 grams/inch. The pigmented compositions, when utilized as water-based inks, demonstrate bond strengths of up to 625 grams/inch when utilized in extrusion lamination printing processes. Moreover, these same inks demonstrate bond strengths of up to 377 grams/inch when utilized in adhesive lamination printing process. The ability of an ink to exhibit a high bond strength when utilized in both adhesion and extrusion lamination printing processes is highly desirable and is an advantageous aspect of the present invention.

When used in ink compositions, the particle size of the emulsion polymer or polymeric composition of the present invention as measured by light scattering will generally range from about 70 nm to about 95 nm, with the preferred particle sizes ranging from about 75 nm to about 85 nm.

The pigmented compositions of the present invention comprise a pigment in addition to the polymeric composition and/or emulsion polymer. The term "pigment" as used herein includes both dyestuffs and pigments. In a preferred embodiment, the pigment is commercially provided in a dispersion which contains a binder, water and an alkalizing agent such as ammonia. The pigment dispersion is mixed with the emulsion polymer and/or the polymeric composition. The amount of pigment added will be dependent on the exact pigmented composition to be formed. In a preferred embodiment, a pigmented composition will comprise about 40% to about 60% by weight of a pigment dispersion, and about 40% to about 60% by weight of the emulsion polymer.

Example pigment dispersions include, but are not limited to, dispersions of one or more of phthalocyanine blue, carbon black, mars black, quinacridone magenta, ivory black, prussian blue, cobalt blue, ultramarine blue, manganese blue, cerulean blue, indathrone blue, chromium oxide, viridian, cobalt green, terre verte, nickel azo yellow, light green oxide, phthalocyanine green-chlorinated copper phthalocyanine, burnt sienna, perinone orange, irgazin orange, quinacridone magenta, cobalt violet, ultramarine violet, manganese violet, dioxazine violet, zinc white, titanium white, flake white, aluminum hydrate, blanc fixe, china clay, lithophone, arylide yellow G, arylide yellow 10G, barium chromate, chrome yellow, chrome lemon, zinc yellow, cadmium yellow, aureolin, naples yellow, nickel titanate, arylide yellow GX, isoindolinone yellow, flavanthrone yellow, yellow ochre, chromophthal yellow 8GN, toluidine red, quinacridone red, permanent crimson, rose madder, alizarin crimson, vermilion, cadmium red, permanent red FRG, brominated anthranthrone, naphthol carbamide, perylene red, quinacridone red, chromophthal red BRN, chromophthal scarlet R, aluminum oxide, barium oxide, bismuth oxide, boric oxide, cadmium oxide, calcium oxide, cerium oxide, chromium oxide, cobalt oxide, copper oxide, iridium oxide, lead oxide, magnesium oxide, manganese oxide, nickel oxide, phosphorus oxide, potassium oxide, rutile, silicon oxide, silver oxide, sodium oxide, strontium oxide, tin oxide, titanium oxide, vanadium oxide, zinc oxide, zirconium oxide, and the like. Preferred pigment dispersions are Flexiverse® pigment dispersions produced by Sun Chemical Company (Amelia, Ohio).

The pigmented composition can optionally contain one or more additives which includes one or more solvent(s), such as amines, alcohols or fast and slow solvents; leveling agent(s); rheology agent(s); coalescing agent(s); pigment wetting agent(s); wax(es); buffering agent(s); dispersing agent(s); surfactant(s); defoaming agent(s); antifoaming agent(s); modifying polymer(s); rewetting agent(s); biocide (s); resolubility agent(s); and combinations thereof. Preferred additives are included in the following amounts, based on total weight: solvent(s) 0–25%; rheology agent(s) 0–5%; wax(es) 0–7%; buffer(s) 0–2%; surfactant(s) 0–2%; defoamer(s) 0–2%; and antifoaming agent(s) 0–2%.

The pigmented compositions of the present invention should have a pH of about 9.5 or lower, or more preferably a pH of about 7.5 to about 8.5.

The pigmented composition of the present invention is generally prepared by mixing one or more pigments such as, but not limited to, Phthalo Blue available from the Sun Chemical Company (Amelia, Ohio) with a preblended mix of a resin solution. Other components such as water and Tego 810 DF defoamer (Tego Chemie Service, Hopewell, Va.) may also be added. The resulting mixture is generally fed into a mill such as, but not limited to, an Eiger Mini Motormill 100 available from Machinery Inc., (Chicago, Ill.) and dispersed to a desired fineness of grind.

The pigmented compositions of the present invention may be applied to the flexible substrate in any appropriate manner. The method of application may be manual or mechanical. If the substrate forms sheets or an elongated sheet which may form a roll then gravure, flexographic procedures, or Mayer rod procedures may be used. The pigmented compositions of the present invention are preferably used as adhesive lamination inks, extrusion lamination inks and surface printing inks.

An article of manufacture according to the invention includes a substrate and an aqueous pigmented composition applied to at least a portion of the substrate. The aqueous pigmented composition includes a pigment and an acrylic-condensation hybrid emulsion polymer according to the present invention. In preferred articles of manufacture, the substrate is a primary substrate, and the article of manufacture also includes a secondary substrate and an adhesive. The adhesive is applied to at least a portion of the aqueous pigmented composition applied to the primary substrate, and the secondary substrate is adhered to the adhesive such that a laminated article of manufacture is provided.

The adhesive used to produce the article of manufacture is broadly defined as meaning any material that allows the secondary substrate to be adhered to the pigmented composition. For example, in extrusion lamination an adhesive includes, but is not limited to, such materials as primers and molten polymers such as molten polyethylene. In adhesive lamination printing, an adhesive includes, but is not limited to, materials such as water-based, solvent-based, or solventless adhesives such as glues or cements. Other materials that may be used as adhesives in the article of manufacture will be readily apparent to those skilled in the art.

A wide variety of materials are suitable for use as substrates in the articles of manufacture. For example, suitable substrates are generally any flexible substrate known in the art including, but not limited to, foils, synthetic organic polymers, metallized films, cellulose containing products, natural fabrics, synthetic fabrics, and combinations of these materials. Because the primary and secondary substrates may be made of the same or different materials, a large variety of laminated structures are provided.

The invention is further described in greater detail by reference to the following non-limiting examples.

EXAMPLES

The following abbreviations are used in the Examples:
AA: Acrylic acid
AdA: Adipic acid
AMS: α-Methylstyrene
CHDA: 1,4-Cyclohexane dicarboxylic acid
CHDM: 1,4-Cyclohexane dimethanol
EHA: 2-Ethylhexyl acrylate
IPA: Isophthalic acid
MPD: 2-Methyl-1,3-propanediol
NPG: Neopentyl glycol
Sty: Styrene All percentages used in the Examples herein are by weight, unless otherwise indicated.

The materials and products described in the examples are characterized by a number of standard techniques. The molecular weight of each polymer was determined via gel permeation chromatography ("GPC") techniques using tetrahydrofuran ("THF") as eluent and poly(styrene) standards. The poly(styrene) standards employed are presently available from Polymer Laboratories Limited (Church Stretton, Great Britain) and are further characterized as having number average molecular weights of 2,250,000; 1,030,000; 570,000; 156,000; 66,000; 28,500; 9,200; 3,250; and 1,250.

Example 1

Preparation of Acrylic-Condensation Hybrid Polymeric Composition

The procedures and general compositions for these acrylic-condensation hybrid polymers are described in U.S. patent application Ser. No. 08/968,321, now issued U.S. Pat. No. 6,194,510.

Particle size was determined by light scattering measurements as follows: the emulsion polymers were diluted to approximately 100 mM concentration with distilled water, then passed through a 0.45 μm filter. A Brookhaven particle sizer was used to measure the average particle size. The average of three measurements was reported.

In the acrylic-condensation hybrid polymeric composition of Polymeric Composition 1, the acrylic portion (A polymer) was composed of 37.58% α-methylstyrene, 18.62% styrene, 33.02% acrylic acid, and 7.64% 2-ethylhexyl acrylate with a Mw equal to 1850. The condensation polymer (B polymer) had a number average molecular weight of 2,000 and was composed of 43.0% 2-methyl-1,3-propanediol, 40.3% isophthalic acid, and 16.7% 1,4-cyclohexane dicarboxylic acid. The molar ratio of acrylic to condensation polymer was 2:1. A solution of the acrylic-condensation hybrid polymer was prepared by addition of distilled water (575 g) and ammonium hydroxide (34.1 g) to a one-liter 4-necked reaction vessel equipped with a condenser and a mechanical agitator. The vessel was heated to 50° C. and the acrylic-condensation hybrid polymer (300 g) was added over a 10 minute period. The temperature was increased to 80° C. and stirred at 250 rpm for 2 h. The resulting solution was cooled to 30° C. and passed through a mesh filter. The physical characteristics of the solution were: 32.26% solids, pH equal to 8.3, and a degree of neutralization of 95%. The monomer percentages for Polymeric Composition 1, together with Polymeric Compositions 2–5, are summarized in Table 1 below. All Polymeric Compositions were prepared in identical fashion.

TABLE 1

|  | Acrylic (A Polymer) | Mw | Condensation (B Polymer) | Mn |
| --- | --- | --- | --- | --- |
| Polymeric Comp. 1 | 37.58% AMS 18.62% Sty 33.02% AA 7.64% EHA | 1800 | 43.0% MPD 40.3% IPA 16.7% CHDA | 2100 |
| Polymeric Comp. 2 | 33.94% AMS 32.28% Sty 33.78% AA | 1800 | 41.4% NPG 44.1% IPA 14.5% AdA | 1900 |
| Polymeric Comp. 3 | 37.58% AMS 18.62% Sty 33.02% AA 7.64% 2-EHA | 1850 | 43.8% MPD 37.0% IPA 19.2% CHDA | 3000 |
| Polymeric Comp. 4 | 33.94% AMS 32.28% Sty 33.78% AA | 1800 | 52% CHDA 29% IPA 19% CHDM | 2500 |
| Polymeric Comp. 5 | 37.58% AMS 18.62% Sty 33.02% AA 7.64% 2-EHA | 1850 | 44.8% MPD 44.1% IPA 11.1% AdA | 920 |

Example 2
Preparation of Emulsion Polymer 1

The following process and formula describes the preparation of a waterborne emulsion polymer in accordance with the present invention.

A one-liter 4-necked reaction vessel was equipped with a mechanical agitator, nitrogen purge and an addition tube. Distilled water (91.84 g), Tergitol® 15-S-9 (0.24 g) (an ethoxylated linear alcohol, Union Carbide, Danbury, Conn.), Polyglycol 1200 (2.31 g) and a water solution of Polymeric Composition 1 (328.11 g) were added to the reaction vessel. The vessel was heated to 82° C. and an initiator solution of ammonium persulfate (0.65 g) dissolved in distilled water (3.25 g) was added over 2 minutes. The reaction was held at 82° C. for 5 minutes. A solution of 2-ethylhexyl acrylate (50.38 g), methyl methacrylate (117.59 g), and Tergitol® 15-S-9 (4.54 g) was added to the reaction vessel over a period of 70 minutes with a constant agitation at 250 rpm. After all the monomer solution addition distilled water (5.52 g) was added and the reaction temperature increased to 85° C. for 30 minutes. t-Butyl hydroperoxide (0.90 g) was added and the reaction held for 2 minutes followed by sodium erythorbate (0.10 g) dissolved in distilled water (0.97 g). The reaction was held for 15 minutes at 85° C. before cooling to 50° C. At 50° C., Pluronic® F-127 (2.63 g) poly(ethylene oxide-co-propylene oxide) dissolved in distilled water (13.85 g), a 2% water solution of Kathon® (0.13 g) (preservative, Rohm & Haas, Philadelphia, Pa.) and another 25.25 g of distilled water was added. The emulsion polymer was filtered through a mesh filter. The physical characteristics of the polymer were: 44.24% solids; pH equal to 8.1; a viscosity of 65 cps measured with a # 2 spindle using a Brookfield viscometer; and a particle size of 80 nm.

Example 3
Preparation of Emulsion Polymer 2

A 500 ml liter 4-necked reaction vessel was equipped with a mechanical agitator, nitrogen purge and an addition tube. Distilled water (30.5 g), Polyglycol 1200 (1.0 g) and a water solution of Polymeric Composition 2 (167.9 g) were added to the reaction vessel. The vessel was heated to 80° C. and an initiator solution of ammonium persulfate (0.60 g) dissolved in distilled water (7.0 g) was added over 2 minutes. The reaction was held at 80° C. for 5 minutes. A solution of butyl acrylate (22.1 g), methyl methacrylate (51.7 g), and Tergitol® 15-S-7 (2.0 g) was added to the reaction vessel over a period of 75 minutes with a constant agitation at 250 rpm. After the monomer solution addition, distilled water (10.0 g) was added and the reaction held at 80° C. for 30 minutes. t-Butyl hydroperoxide (0.6 g) was added and the reaction held for 2 minutes followed by sodium erythorbate (0.10 g) dissolved in distilled water (0.97 g). The reaction was held for 30 minutes at 80° C. before cooling to 50° C. before adding distilled water (2.5 g). The emulsion polymer was filtered through a mesh filter. The physical characteristics of the polymer were: 44.17% solids; pH equal to 8.2; a viscosity of 49 cps measured with a # 2 spindle using a Brookfield viscometer; and a particle size of 80 nm.

Example 4
Preparation of Emulsion Polymer 3

A one-liter 4-necked reaction vessel was equipped with a mechanical agitator, nitrogen purge and an addition tube. Distilled water (88.3 g), Polyglycol 1200 (2.0 g) and a water solution of Polymeric Composition 4 (321.6 g; 112.1 g solid) were added to the reaction vessel. The vessel was heated to 74° C. and an initiator solution of ammonium persulfate (1.2 g) dissolved in distilled water (9.0 g) was added over 2 minutes then held at 74° C. for 5 min. The reaction was heated to 80° C. and a solution of butyl acrylate (44.2 g), methyl methacrylate (103.3 g), and Tergitol® 15-S-7 (4.0 g) was added to the reaction vessel over a period of 75 minutes with a constant agitation at 250 rpm. After all the monomer solution addition distilled water (15.0 g) was added and the reaction temperature held at 80° C. for 30 minutes. t-Butyl hydroperoxide (1.2 g) was added and the reaction held for 2 minutes followed by sodium erythorbate (0.20 g) dissolved in distilled water (5.0 g). The reaction was held for 30 minutes at 80° C. before cooling to 50° C. The emulsion polymer was filtered through a mesh filter. The physical characteristics of the polymer were: 44.1% solids; pH equal to 8.1; a viscosity of 108 cps measured with a # 2 spindle using a Brookfield viscometer; and a particle size of 81 nm.

Example 5
Preparation of Emulsion Polymer 4

A one-liter 4-necked reaction vessel was equipped with a mechanical agitator, nitrogen purge and an addition tube. Distilled water (53.8 g), Polyglycol 1200 (1.0 g) and a water solution of Polymeric Composition 5 (143.9 g) were added to the reaction vessel. The vessel was heated to 74° C. and an initiator solution of ammonium persulfate (0.6 g) dissolved in distilled water (9.0 g) was added over 2 minutes. The reaction was held at 74° C. for 5 minutes then heated to 80° C. A solution of butyl acrylate (22.1 g), methyl methacrylate (51.7 g), and Tergitole 15-S-7 (2.0 g) was added to the reaction vessel over a period of 75 minutes with a constant agitation at 250 rpm. After all the monomer solution addition distilled water (10.0 g) was added and the reaction temperature held at 80° C. for 30 minutes. t-Butyl hydroperoxide (0.60 g) was added and the reaction held for 2 minutes followed by sodium erythorbate (0.10 g) dissolved in distilled water (2.0 g). The reaction was held for 30 minutes at 80° C. before cooling to 50° C. The emulsion polymer was filtered through a mesh filter. The physical characteristics of the polymer were: 43.2% solids; pH equal to 8.1; and a viscosity of 54 cps measured with a # 2 spindle using a Brookfield viscometer.

Example 6
Preparation of Emulsion Polymer 5

A one-liter 4-necked reaction vessel was equipped with a mechanical agitator, nitrogen purge and an addition tube. Distilled water (66.6 g), Polyglycol 1200 (2.0 g) and a water solution of Polymeric Composition 4 (330.0 g; 112.2 g) were added to the reaction vessel. The vessel was heated to 74° C. and an initiator solution of ammonium persulfate (1.2 g) dissolved in distilled water (9.0 g) was added over 2 minutes. The reaction was held at 74° C. for 5 minutes then heated to 80° C. A solution of butyl acrylate (17.7 g), methyl methacrylate (103.3 g), butyl methacrylate (26.9 g), and Tergitol® 15-S-7 (4.0 g) was added to the reaction vessel over a period of 75 minutes with a constant agitation at 250 rpm. After all the monomer solution addition distilled water (15.0 g) was added and the reaction temperature held at 80° C. for 30 minutes. t-Butyl hydroperoxide (1.2 g) was added and the reaction held for 2 minutes followed by sodium erythorbate (0.20 g) dissolved in distilled water (5.0 g). The reaction was held for 30 minutes at 80° C. before cooling to 50° C. The emulsion polymer was filtered through a mesh filter. The physical characteristics of the polymer were: 45.2% solids; pH equal to 8.2; and a viscosity of 127 cps measured with a # 2 spindle using a Brookfield viscometer.

Example 7
Preparation of Emulsion Polymer 6

A one-liter 4-necked reaction vessel was equipped with a mechanical agitator, nitrogen purge and an addition tube. Distilled water (28.7 g), Polyglycol 1200 (2.0 g) and a water solution of Polymeric Composition 4 (330.0 g; 112.2 g solids) were added to the reaction vessel. The vessel was heated to 80° C. and an initiator solution of ammonium persulfate (0.91 g) dissolved in distilled water (9.0 g) was added over 2 minutes. The reaction was held at 80° C. for 5 minutes. A solution of butyl acrylate (13.5 g), methyl methacrylate (78.5 g), butyl methacrylate (20.2 g), and Tergitol® 15-S-7 (3.0 g) was added to the reaction vessel over a period of 75 minutes with a constant agitation at 250 rpm. After all the monomer solution addition distilled water (10.0 g) was added and the reaction temperature held at 80° C. for 30 minutes. t-Butyl hydroperoxide (0.9 g) was added and the reaction held for 2 minutes followed by sodium erythorbate (0.15 g) dissolved in distilled water (1.0 g). The reaction was held for 30 minutes at 80° C. before cooling to 50° C. The emulsion polymer was filtered through a mesh filter. The physical characteristics of the polymer were: 45.6% solids; pH equal to 8.2; a viscosity of 656 cps measured with a # 2 spindle using a Brookfield viscometer.

Example 8
Preparation of Emulsion Polymer 7

A one-liter 4-necked reaction vessel was equipped with a mechanical agitator, nitrogen purge and an addition tube. Distilled water (85.1 g), Polyglycol 1200 (1.7 g) and a water solution of Polymeric Composition 3 (253.0 g, 86.8 g solids) were added to the reaction vessel. The vessel was heated to 80° C. and an initiator solution of ammonium persulfate (0.25 g) dissolved in distilled water (7.0 g) was added over 2 minutes. The reaction was held at 80° C. for 5 minutes. A solution of 2-ethylhexyl acrylate (37.2 g), methyl methacrylate (86.8 g), and Tergitol® 15-S-7 (3.4 g) was added to the reaction vessel over a period of 75 minutes with a constant agitation at 250 rpm. After all the monomer solution addition distilled water (15.0 g) was added and the reaction temperature increased to 80° C. for 30 minutes. t-Butyl hydroperoxide (1.0 g) was added and the reaction held for 2 minutes followed by sodium erythorbate (0.17 g) dissolved in distilled water (1.0 g). The reaction was held for 30 minutes at 80° C. before cooling to 50° C. The emulsion polymer was filtered through a mesh filter. The physical characteristics of the polymer were: 42.74% solids; pH equal to 8.1; and a viscosity of 46 cps measured with a # 2 spindle using a Brookfield viscometer.

Example 9
Preparation of Ink 1

Emulsion polymer 1 (40.0 g) and 60 g of Flexiverse® WFD 5006 (Sun Chemical, Amelia, Ohio) were mixed with a rotary agitator until homogeneous. The ink was held at ambient temperature for three hours prior to evaluation.

Example 10
Preparation of Ink 2

Emulsion polymer 2 (40.0 g) and 60 g of Flexiverse® WFD 5006 were mixed with a rotary agitator until homogeneous. The ink was held at ambient temperature for three hours prior to evaluation.

Example 11
Preparation of Ink 3

Emulsion polymer 3 (40.0 g) and 60 g of Flexiverse® WFD 5006 were mixed with a rotary agitator until homogeneous. The ink was held at ambient temperature for three hours prior to evaluation.

Example 12
Preparation of Ink 4

Emulsion polymer 4 (40.0 g) and 60 g of Flexiverse® WFD 5006 were mixed with a rotary agitator until homogeneous. The ink was held at ambient temperature for three hours prior to evaluation.

Example 13
Preparation of Ink 5

Emulsion polymer 5 (40.0 g) and 60 g of Flexiverse® WFD 5006 were mixed with a rotary agitator until homogeneous. The ink was held at ambient temperature for three hours prior to evaluation.

Example 14
Preparation of Ink 6

Emulsion polymer 6 (40.0 g) and 60 g of Flexiverse® WFD 5006 were mixed with a rotary agitator until homogeneous. The ink was held at ambient temperature for three hours prior to evaluation.

Example 15
Preparation of Ink 7

Emulsion polymer 7 (40.0 g) and 60 g of Flexiverse® White WFD 5006 were mixed with a rotary agitator until homogeneous. The ink was held at ambient temperature for three hours prior to evaluation.

Example 16
Preparation of Ink 8

Emulsion polymer 7 (416.5 g) and 263.2 g of a dispersion were mixed with a rotary agitator until homogeneous. The dispersion was prepared by mixing a dry blue pigment, Phthalo Blue 15:3 (Sun Chemical, Amelia, Ohio) with a preblended with 1134 g; 356 g solids of Joncryl® HPD 96 (SC Johnson Polymer, Sturtevant, Wis.), 15 g of Tergo 810 DF, and 426 g of distilled water. This pre-dispersion is then fed into a small media mill (Eiger "Mini" Motormill 100, Eiger Machinery INC., Chicago, Ill.) and dispersed to the required fineness of grind (approximately 20 minutes). The ink was held at ambient temperature for three hours prior to evaluation.

Example 17
Preparation of Ink 9

Emulsion polymer 1 (40.0 g) and 60.0 g of a Flexiverse® Red RFD-4247 (Sun Chemical, Amelia, Ohio) were mixed with a rotary agitator until homogeneous. The ink was held at ambient temperature for three hours prior to evaluation.

Example 18
Preparation of Ink 10

Emulsion polymer 1 (40.0 g) and 60.0 g of a Flexiverse® Cyan Blue (Sun Chemical, Amelia, Ohio) BFD-1121 were mixed with a rotary agitator until homogeneous. The ink was held at ambient temperature for three hours prior to evaluation.

Example 19
Preparation of Ink 11

Joncryl® 624 (40.0 g) and 60.0 g of a Flexiverse® White WFD 5006 were mixed with a rotary agitator until homogeneous. The ink was held at ambient temperature for three hours prior to evaluation.

TABLE 2

| Ink | Adhesive Lamination, 72 hrs | | | Extrusion Lamination | | | |
| --- | --- | --- | --- | --- | --- | --- | --- |
| | Mel 813 | 48LBT | AET 523 | Mel 813 | 48LBT | AET 523 | M-44 |
| Ink 1 | 351 | 320 | 377 | 600 | 368 | 340 | 625 |
| Ink 2 | 65 | 210 | 120 | 460 | 450 | 175 | |
| Ink 3 | 157 | 228 | 138 | 375 | 340 | 325 | |
| Ink 4 | 240 | 20 | 165 | | | | |
| Ink 5 | 215 | 190 | 100 | 660 | 740 | 400 | |
| Ink 6 | 160 | 170 | 80 | 570 | 800 | 400 | |
| Ink 7 | 270 | 265 | 125 | 700 | 600 | 365 | |
| Ink 8 | 300 | | 260 | | | | |
| Ink 9 | 351 | 320 | 377 | 403 | 368 | 200 | 428 |
| Ink 10 | | 308 | 181 | | 690 | 500 | |
| Ink 11 | 308 | 250 | 70 | 50 | 80 | 30 | |

Example 20
Tests of Bond Strengths of Inks using Lamination Protocols

1. Process for Testing in Adhesive Lamination

A finished ink was made by mixing together 40 to 60% by weight pigment dispersion with 40 to 60% by weight polymer as the letdown vehicle. Initial viscosity readings were made and then reduced to press viscosity (25–26" #2 Zahn viscosity cup) with water. The finished inks were then applied to the treated primary films with a 300P flexo handproofer and dried for 10 seconds at 65° C. in a forced air oven and allowed to stand overnight. A water-based adhesive, C-1045 (Century International Adhesives and Coatings Corp., Columbus, Ohio) was then applied over the inked primary films, using the appropriate draw down rods (US #4 or #5) to achieve a coating weight of 2 grams per square meter. Draw downs were then dried for 10 seconds at 65° C. in a forced air oven. The adhesive coated films were then laminated to a secondary film at 190° F., 40 psi, 1 second heat seal dwell. Types of film used were polyester, polypropylene, PvDC coated polyester.

2. Laminates were then tested for 1 hour and 72-hour bond strengths (grams/inch), and ink adhesive using an Instron® machine. The 72-hour bond strength results are shown in Table 2.

3. Process for Testing in Extrusion Lamination

A finished ink was made by mixing 40–60% pigment dispersion and 40–60% polymer as the letdown vehicle together. Initial viscosity readings were made and then reduced to press viscosity (25–26" #2 Zahn viscosity cup) with water. The finished inks were then applied to the treated primary films with a 300P flexo handproofer and dried for 10 seconds at 65° C. in a forced air oven and allowed to stand overnight. A PEI (polyethyleneimine) primer mixture (1:1:1 ratio of Mica A-131-X (Mica Corporation, Stratford, Conn.), isopropanol, distilled water) was then applied to the inked primary films with US#3 rod and dried for 10 seconds at 65° C. in a forced air oven. The films were allowed to stand for 2 hours before being laminated. The secondary film was a white polyethylene on an aluminum foil-backed stock. The polyethylene was Corona treated with a hand held Corona treater. The primed films were laminated to the PE extrudate on foil-backed stock at 400° F., 40 psi, 1 second heat seal dwell using a Sentinel Heat Sealer with 1 heated jaw.

The extrusion laminates were then tested for bond strengths (grams/inch) using a T-pull technique, and ink adhesive using an Instron® Model 1011 (Instron®, Canton, Mass.). The results are shown in Table 2. The rate of pull was 1 inch/min.

The following materials were used in the Examples:

Primary and Secondary Films used:

| | | |
| --- | --- | --- |
| 1. T-523 | Applied Extrusion Technologies Inc. | Terre Haute, IN |
| 2. Melinex 813 | DuPont Polyester Films | Hopewell, VA |
| 3. 48LBT | DuPont Polyester Films | Hopewell, VA |
| 4. M-44 | DuPont Polyester Films | Hopewell, VA |

Commercially Available Pigment Dispersions used:

| | | |
| --- | --- | --- |
| 1. Flexiverse ® White WFD-5006 | Sun Chemical | Amelia, OH |
| 2. Flexiverse ® Red RFD-4247 | Sun Chemical | Amelia, OH |
| 3. Flexiverse ® Blue BFD-1121 | Sun Chemical | Amelia, OH |

-continued

Additives for Inks

Thickeners

| | | |
|---|---|---|
| 1. Joncryl ® 142 | S.C. Johnson Polymer | Sturtevant, WI |

Alcohols and Solvents

| | | |
|---|---|---|
| 1. Isopropanol | Aldrich | Milwaukee, WI |
| 2. Propasol ® P | Union Carbide | Danbury, CT |
| 3. Butyl Cellosolve ® | Union Carbide | Danbury, CT |

Defoamers

| | | |
|---|---|---|
| 1. Dehydrant 1293 | Henkel | LaGrange, IL |
| 2. PI-209 | Ultra Additives | Paterson, NJ |
| 3. Byk ® 024 | BYK ®-Chemie USA | Wallingford, CT |
| 4. Byk ® 026 | BYK ®-Chemie USA | Wallingford, CT |
| 5. Surfynol ® DF-37 | Air Products | Allentown, PA |
| 6. Surfynol ® DF-70 | Air Products | Allentown, PA |

Wetting Agents

| | | |
|---|---|---|
| 1. Tego Wet 250 | Tego Chemie Service USA | Hopewell, VA |
| 2. Tego Wet 260 | Tego Chemie Service USA | Hopewell, VA |
| 3. Surfynol ® 420 | Air Products | Allentown, PA |
| 4. Surfynol ® 440 | Air Products | Allentown, PA |

While only a few, preferred embodiments of the invention have been described, those of ordinary skill in the art will recognize that the embodiment may be modified and altered without departing from the central spirit and scope of the invention. Thus, the preferred embodiments described above are to be considered in all respects as illustrative and not restrictive, the scope of the invention being indicated by the following claims, rather than by the foregoing description, and all changes which come within the meaning and range of equivalents of the claims are intended to be embraced.

What is claimed is:

1. An aqueous pigmented composition, comprising:
   (a) a pigment; and
   (b) an acrylic-condensation hybrid emulsion polymer comprising:
      (i) polymerized unsaturated monomers; and
      (ii) a polymeric surfactant comprised of a polymeric composition that is the reaction product of an A polymer and a B polymer, the A polymer being an addition polymer having 3.5 or more reactive functional groups per polymer chain, and the B polymer having about 2 to about 3 functional groups per polymer chain that are co-reactive with the reactive functional groups of the A polymer.

2. The aqueous pigmented composition according to claim 1, wherein the polymeric composition has a Tg from about 20° C. to about 70° C.

3. The aqueous pigmented composition according to claim 2, wherein the polymeric composition has a Tg from about 40° C. to about 50° C.

4. The aqueous pigmented composition according to claim 3, wherein the polymeric composition has a Tg of about 45° C.

5. The aqueous pigmented composition according to claim 1, wherein the B polymer has about 2 functional groups per polymer chain and the molar ratio of A polymer to B polymer is about 2:1.

6. The aqueous pigmented composition according to claim 5, wherein the co-reactive functional group of said B polymer is hydroxyl.

7. The aqueous pigmented composition according to claim 1, wherein the polymeric composition is formed by reacting (a) an A polymer consisting of polymerized monomers of styrene, α-methylstyrene, 2-ethylhexyl acrylate and acrylic acid, the A polymer having a weight average molecular weight of about 1000 to about 3000 and (b) a B condensation polymer consisting of polymerized monomers of 2-methyl-1,3-propanediol, isophthalic acid, and 1,4-cyclohexane dicarboxylic acid, the B condensation polymer having a number average molecular weight of about 1000 to about 3000.

8. The aqueous pigmented composition according to claim 7, wherein the polymeric composition is about 25% to about 50% by weight the acrylic-condensation hybrid emulsion polymer.

9. The aqueous pigmented composition according to claim 8, wherein the non-gelling polymeric composition component is about 38% by weight of the acrylic-condensation hybrid emulsion polymer.

10. The aqueous pigmented composition according to claim 1, wherein the acrylic-condensation hybrid emulsion polymer has a Tg from about −31° C. to about 70° C.

11. The aqueous pigmented composition according to claim 10, wherein the unsaturated monomers are selected from the group consisting of styrenic monomers; monomers having the general formula $CH_2=C(X)C(O)OR$ where X is either H or $CH_3$, and R is an alkyl having at least one carbon; and combinations of these monomers.

12. The aqueous pigmented composition according to claim 11, wherein the acrylic-condensation hybrid emulsion polymer has a Tg from about 30° C. to about 45° C.

13. The aqueous pigmented composition according to claim 12, wherein the acrylic-condensation hybrid emulsion polymer has a Tg of about 39° C.

14. The aqueous pigmented composition according to claim 11, wherein the unsaturated monomers are selected from the group consisting of styrene, α-methylstyrene, butyl acrylate, 2-ethylhexyl acrylate, methyl methacrylate, and combinations thereof.

15. The aqueous pigmented composition according to claim 1, wherein the pigment is contained within a pigment dispersion.

16. The aqueous pigmented composition according to claim 15, wherein the pigment is selected from the group consisting of phthalocyanine blue, carbon black, mars black, quinacridone magenta, ivory black, prussian blue, cobalt blue, ultramarine blue, manganese blue, cerulean blue, indathrone blue, chromium oxide, viridian, cobalt green, terre verte, nickel azo yellow, light green oxide, phthalocyanine green-chlorinated copper phthalocyanine, burnt sienna, perinone orange, irgazin orange, quinacridone magenta, cobalt violet, ultramarine violet, manganese violet, dioxazine violet, zinc white, titanium white, flake white, aluminum hydrate, blanc fixe, china clay, lithophone, arylide yellow G, arylide yellow 10G, barium chromate, chrome yellow, chrome lemon, zinc yellow, cadmium yellow, aureolin, naples yellow, nickel titanate, arylide yellow GX, isoindolinone yellow, flavanthrone yellow, yellow ochre, chromophthal yellow 8GN, toluidine red, quinacridone red, permanent crimson, rose madder, alizarin crimson, vermilion, cadmium red, permanent red FRG, brominated anthranthrone, naphthol carbamide, perylene red, quinacridone red, chromophthal red BRN, chromophthal scarlet R, aluminum oxide, barium oxide, bismuth oxide, boric oxide, cadmium oxide, calcium oxide, cerium oxide, chromium oxide, cobalt oxide, copper oxide, iridium oxide, lead oxide, magnesium oxide, manganese oxide, nickel oxide, phosphorus oxide, potassium oxide, rutile, silicon oxide, silver oxide, sodium oxide, strontium oxide, tin oxide, titanium oxide, vanadium oxide, zinc oxide, zirconium oxide, and combinations thereof.

17. The aqueous pigmented composition according to claim 15, wherein the composition comprises about 40% to about 60% by weight pigment dispersion and about 40% to about 60% by weight acrylic-condensation hybrid emulsion polymer.

18. The aqueous pigmented composition according to claim 1, further comprising at least one additive selected from the group consisting of a solvent, a leveling agent, a rheology agent, a coalescing agent, a pigment wetting agent, a wax, a buffering agent, a dispersing agent, a surfactant, a defoaming agent, an antifoaming agent, a modifying polymer, a rewetting agent, a biocide, a resolubility agent, and combinations thereof.

19. The aqueous pigmented composition according to claim 1, wherein the aqueous pigment composition is selected from the group consisting of an adhesive laminating ink and an extrusion laminating ink.

20. A method of producing an aqueous pigmented composition, comprising: mixing together a pigment and an acrylic-condensation hybrid emulsion polymer to produce an aqueous pigmented composition, wherein the polymer emulsion comprises polymerized unsaturated monomers and a polymeric surfactant comprised of a polymeric composition that is the reaction product of an A polymer and a B polymer, the A polymer being an addition polymer having 3.5 or more reactive functional groups per polymer chain, and the B polymer having about 2 to about 3 functional groups per polymer chain that are co-reactive with the reactive functional groups of the A polymer.

21. An aqueous pigmented composition made according to the process of claim 20.

22. An acrylic-condensation hybrid emulsion polymer comprising:
(a) polymerized unsaturated monomers; and
(b) a polymeric surfactant comprised of a polymeric composition that is the reaction product of an A polymer and a B polymer, the A polymer being an addition polymer having 3.5 or more reactive functional groups per polymer chain, and the B polymer having about 2 to about 3 functional groups per polymer chain that are co-reactive with the reactive functional groups of the A polymer.

23. The acrylic-condensation hybrid emulsion polymer according to claim 22, wherein the polymeric composition has a Tg from about 20° C. to about 70° C.

24. The acrylic-condensation hybrid emulsion polymer according to claim 23, wherein the polymeric composition has a Tg from about 40° C. to about 50° C.

25. The acrylic-condensation hybrid emulsion polymer according to claim 24, wherein the polymeric composition has a Tg of about 45° C.

26. The acrylic-condensation hybrid emulsion polymer according to claim 22, wherein the B polymer has about 2 functional groups per polymer chain and the molar ratio of A polymer to B polymer is about 2:1.

27. The acrylic-condensation hybrid emulsion polymer according to claim 22, wherein the co-reactive functional group of said B polymer is hydroxyl.

28. The acrylic-condensation hybrid emulsion polymer according to claim 22, wherein the polymeric composition is formed by reacting (a) an A polymer consisting of polymerized monomers of styrene, α-methylstyrene, 2-ethylhexyl acrylate and acrylic acid, the A polymer having a weight average molecular weight of about 1000 to about 3000 and (b) a B condensation polymer consisting of polymerized monomers of 2-methyl-1,3-propanediol, isophthalic acid, and 1,4-cyclohexane dicarboxylic acid, the B condensation polymer having a number average molecular weight of about 1000 to about 3000.

29. The acrylic-condensation hybrid emulsion polymer according to claim 28, wherein the unsaturated monomers are selected from the group consisting of styrenic monomers; monomers having the general formula $CH_2=C(X)C(O)OR$ where X is either H or $CH_3$, and R is an alkyl having at least one carbon; and combinations of these monomers.

30. The acrylic-condensation hybrid emulsion polymer according to claim 29, wherein the unsaturated monomers are selected from the group consisting of styrene, α-methylstyrene, butyl acrylate, 2-ethylhexyl acrylate, methyl methacrylate, and combinations thereof.

31. The acrylic-condensation hybrid emulsion polymer according to claim 22, wherein the polymeric composition is about 25% to about 50% by weight the acrylic-condensation hybrid emulsion polymer.

32. The acrylic-condensation hybrid emulsion polymer according claim 31, wherein the non-gelling polymeric composition component is about 38% by weight of the acrylic-condensation hybrid emulsion polymer.

33. The acrylic-condensation hybrid emulsion polymer according to claim 22, wherein the acrylic-condensation hybrid emulsion polymer has a Tg from about −31° C. to about 70° C.

34. The acrylic-condensation hybrid emulsion polymer according to claim 22, wherein the acrylic-condensation hybrid emulsion polymer has a Tg from about 30° C. to about 45° C.

35. The acrylic-condensation hybrid emulsion polymer according to claim 34, wherein the acrylic-condensation hybrid emulsion polymer has a Tg of about 39° C.

36. A method of producing an acrylic-condensation hybrid emulsion polymer, comprising reacting unsaturated monomers with a polymeric surfactant at a sufficient temperature in the presence of an initiator for a sufficient period of time to produce an acrylic-condensation hybrid emulsion polymer, wherein the polymeric surfactant is comprised of a polymeric composition which is the reaction product of an A polymer and a B polymer, the A polymer being an addition polymer having 3.5 or more reactive functional groups per polymer chain, and the B polymer having about 2 to about 3 functional groups per polymer chain that are co-reactive with the reactive functional groups of the A polymer.

37. The method of producing an acrylic-condensation hybrid emulsion polymer according to claim 36, wherein the polymeric composition is formed by reacting (a) an A polymer consisting of polymerized monomers of styrene, α-methylstyrene, 2-ethylhexyl acrylate, and acrylic acid, the A polymer, having a weight average molecular weight of about 1000 to about 3000 and (b) a B condensation polymer consisting of polymerized monomers of 2-methyl-1,3-propanediol, isophthalic acid, and 1,4-cyclohexane dicarboxylic acid, the B condensation polymer having a number average molecular weight of about 1000 to about 3000.

38. The method of producing an acrylic-condensation hybrid emulsion polymer according to claim 36, wherein the polymeric composition is about 25% to about 50% by weight the acrylic-condensation hybrid emulsion polymer.

39. The method of producing an acrylic-condensation hybrid emulsion polymer according to claim 36, wherein the acrylic-condensation hybrid emulsion polymer has a Tg from about −31° C. to about 70° C.

40. The method of producing an acrylic-condensation hybrid emulsion polymer according to claim 36, wherein the unsaturated monomers are selected from the group consisting of styrenic monomers; monomers having the general formula CH2=C(X)C(O)OR where X is either H or CH$_3$, and R is an alkyl having at least one carbon; and combinations of these monomers.

41. The method of producing an acrylic-condensation hybrid emulsion polymer according to claim 40, wherein the unsaturated are selected from the group consisting of styrene, α-methylstyrene, butyl acrylate, 2-ethylhexyl acrylate, methyl methacrylate, and combinations thereof.

42. The method of producing an acrylic-condensation hybrid emulsion polymer according to claim 36, wherein the acrylic-condensation hybrid emulsion polymer has a Tg from about 30° C. to about 45° C.

43. An acrylic-condensation hybrid emulsion polymer made according to the process of claim 36.

44. An article of manufacture, comprising:
 (a) a substrate;
 (b) an aqueous pigmented composition applied to at least a portion of the substrate, the aqueous pigmented composition comprising:
  (i) a pigment; and
  (ii) an acrylic-condensation hybrid emulsion polymer comprising polymerized unsaturated monomers and a polymeric surfactant comprised of a polymeric composition that is the reaction product of an A polymer and a B polymer, the A polymer being an addition polymer having 3.5 or more reactive functional groups per polymer chain, and the B polymer having about 2 to about 3 functional groups per polymer chain that are co-reactive with the reactive functional groups of the A polymer.

45. The article of manufacture according to claim 44, wherein the polymeric composition has a Tg from about 20° C. to about 70° C.

46. The article of manufacture according to claim 45, wherein the polymeric composition has a Tg from about 40° C. to about 50° C.

47. The article of manufacture according to claim 46, wherein the polymeric composition has a Tg of about 45° C.

48. The article of manufacture according to claim 44, wherein the B polymer has about 2 functional groups per polymer chain and the molar ratio of A polymer to B polymer is about 2:1.

49. The article of manufacture according to claim 44, wherein the co-reactive functional group of said B polymer is hydroxyl.

50. The article of manufacture according to claim 44, wherein the polymeric composition is formed by reacting (a) an A polymer consisting of polymerized monomers of styrene, α-methylstyrene, 2-ethylhexyl acrylate and acrylic acid, the A polymer having a weight average molecular weight of about 1000 to about 3000 and (b) a B condensation polymer consisting of polymerized monomers of 2-methyl-1,3-propanediol, isophthalic acid, and 1,4-cyclohexane dicarboxylic acid, the B condensation polymer having a number average molecular weight of about 1000 to about 3000.

51. The article of manufacture according to claim 44, wherein the polymeric composition is about 25% to about 50% by weight the arylic-condensation hybrid emulsion polymer.

52. The article of manufacture according to claim 44, wherein the non-gelling polymeric composition component is about 38% by weight of the acrylic-condensation hybrid emulsion polymer.

53. The article of manufacture according to claim 44, wherein the acrylic-condensation hybrid emulsion polymer has a Tg from about −31° C. to about 70° C.

54. The article of manufacture according to claim 53, wherein the unsaturated monomers are selected from the group consisting of styrenic monomers; monomers having the general formula CH2=C(X)C(O)OR where X is either H or CH$_3$, and R is an alkyl having at least one carbon; and combinations of these monomers.

55. The article of manufacture according to claim 54, wherein the acrylic-condensation hybrid emulsion polymer has a Tg from about 30° C. to about 45° C.

56. The article of manufacture according to claim 55, wherein the acrylic-condensation hybrid emulsion polymer has a Tg of about 39° C.

57. The article of manufacture according to claim 54, wherein the unsaturated monomers are selected from the group consisting of styrene, α-methylstyrene, butyl acrylate, 2-ethylhexyl acrylate, methyl methacrylate, and combinations thereof.

58. The article of manufacture according to claim 44, wherein the pigment is contained within a pigment dispersion.

59. The article of manufacture according to claim 58, wherein the pigment is selected from the group consisting of phthalocyanine blue, carbon black, mars black, quinacridone magenta, ivory black, prussian blue, cobalt blue, ultramarine blue, manganese blue, cerulean blue, indathrone blue, chromium oxide, viridian, cobalt green, terre verte, nickel azo yellow, light green oxide, phthalocyanine green-chlorinated copper phthalocyanine, burnt sienna, perinone orange, irgazin orange, quinacridone magenta, cobalt violet, ultramarine violet, manganese violet, dioxazine violet, zinc white, titanium white, flake white, aluminum hydrate, blanc fixe, china clay, lithophone, arylide yellow G, arylide yellow 10G, barium chromate, chrome yellow, chrome lemon, zinc yellow, cadmium yellow, aureolin, naples yellow, nickel titanate, arylide yellow GX, isoindolinone yellow, flavanthrone yellow, yellow ochre, chromophthal yellow 8GN, toluidine red, quinacridone red, permanent crimson, rose madder, alizarin crimson, vermilion, cadmium red, permanent red FRG, brominated anthranthrone, naphthol carbamide, perylene red, quinacridone red, chromophthal red BRN, chromophthal scarlet R, aluminum oxide, barium oxide, bismuth oxide, boric oxide, cadmium oxide, calcium oxide, cerium oxide, chromium oxide, cobalt oxide, copper oxide, iridium oxide, lead oxide, magnesium oxide, manganese oxide, nickel oxide, phosphorus oxide, potassium oxide, rutile, silicon oxide, silver oxide, sodium oxide, strontium oxide, tin oxide, titanium oxide, vanadium oxide, zinc oxide, zirconium oxide, and combinations thereof.

60. The article of manufacture according to claim 58, wherein the composition comprises about 40% to about 60% by weight pigment dispersion and about 40% to about 60% by weight acrylic-condensation hybrid emulsion polymer.

61. The article of manufacture according to claim 44, wherein the aqueous pigmented composition further comprises at least one additive selected from the group consisting of a solvent, a leveling agent, a rheology agent, a coalescing agent, a pigment wetting agent, a wax, a buffering agent, a dispersing agent, a surfactant, a defoaming agent, an antifoaming agent, a modifying polymer, a rewetting agent, a biocide, a resolubility agent, and combinations thereof.

62. The article of manufacture according to claim 44, wherein the substrate is selected from the group consisting of polypropylene, polyethylene, polyethylene terephthalate and combinations thereof.

63. The article of manufacture according to claim 44, wherein the substrate is a primary substrate, and the article of manufacture further comprises a secondary substrate and an adhesive, wherein the adhesive is applied to at least a portion of the aqueous pigmented composition applied to the primary substrate and the secondary substrate is adhered to the adhesive, whereby the article of manufacture has a laminated structure.

64. A method of producing an article of manufacture, comprising applying a pigmented composition to at least a portion of a substrate, the pigmented composition comprising:

(a) a pigment; and
(b) an acrylic-condensation hybrid emulsion polymer comprising polymerized unsaturated monomers and a polymeric surfactant comprised of a polymeric composition that is the reaction product of an A polymer and a B polymer, the A polymer being an addition polymer having 3.5 or more reactive functional groups per polymer chain, and the B polymer having about 2 to about 3 functional groups per polymer chain that are co-reactive with the reactive functional groups of the A polymer.

65. The method of producing an article of manufacture according to claim 64, wherein the polymeric composition has a Tg from about 20° C. to about 70° C.

66. The method of producing an article of manufacture according to claim 64, wherein the polymeric composition is formed by reacting (a) an A polymer consisting of polymerized monomers of styrene, α-methylstyrene, and acrylic acid, the A polymer having a weight average molecular weight of about 1000 to about 3000 and (b) a B condensation polymer consisting of polymerized monomers of 2-methyl-1,3-propanediol, isophthalic acid, and 1,4-cyclohexane dicarboxylic acid, the B condensation polymer having a number average molecular weight of about 1000 to about 3000.

67. The method of producing an article of manufacture according to claim 64, wherein the unsaturated monomers are selected from the group consisting of styrenic monomers; monomers having the general formula $CH_2=C(X)C(O)OR$ where X is either H or $CH_3$, and R is an alkyl having at least one carbon; and combinations of these monomers.

68. An article of manufacture produced according to the process of claim 64.

* * * * *